United States Patent Office 3,182,090
Patented May 4, 1965

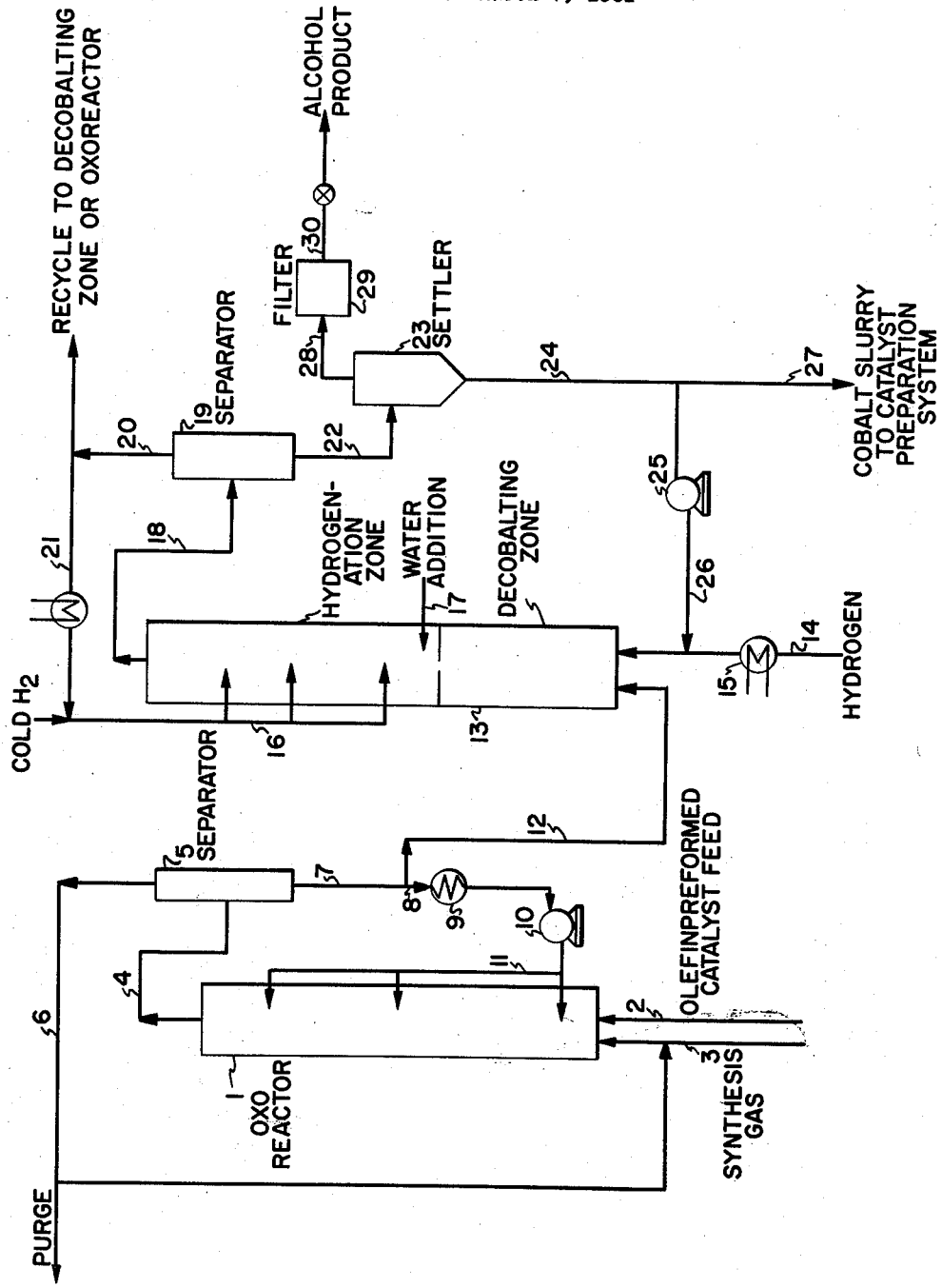

3,182,090
OXO PROCESS FOR PRODUCING ALCOHOLS FROM OLEFINS
Joseph Kern Mertzweiller, Baton Rouge, La., and Rhea N. Watts, deceased, late of St. Francisville, La., by Beulah Smith Watts, legal representative, St. Francisville, La., assignors to Esso Research and Engineering Company, a corporation of Delaware
Filed Mar. 7, 1961, Ser. No. 94,082
6 Claims. (Cl. 260—638)

The present invention relates to the production of alcohols from olefins. More particularly, the invention relates to a combination process wherein olefins are converted to aldehydes via the oxo reaction, and the aldehydes thus produced are catalytically hydrogenated to alcohols. Still more particularly, the invention relates to a combination process wherein olefins are converted to alcohols by reacting the olefin with carbon monoxide and hydrogen in the presence of a cobalt carbonyl catalyst and hydrogenating the thus obtained aldehydic product without removing the cobalt therefrom, all steps in said combination process being carried out at pressures in the range of 200 to 1500 p.s.i.g.

It is well known in the art that aldehyde compounds may be synthesized from organic compounds containing olefinic linkages by a reaction with carbon monoxide and hydrogen in the presence of catalysts containing metals of the iron group, particularly cobalt. The product of the carbonylation or oxo reaction, as this process is commonly known, predominantly comprises aldehydes having one more carbon atom than the olefinic reactant, although other oxygenated products are formed to a lesser degree. These aldehydes may be hydrogenated in the presence of any of the well known hydrogenation catalysts, such as supported or unsupported nickel, copper chromite, sulf-active catalysts such as the oxides or sulfides of tungsten, nickel or molybdenum, to provide the corresponding alcohols. The primary alcohols produced in this manner serve to supply the large market for plasticizers, detergents, solvents and the like. Alternatively, if desired, the oxo aldehydes may be converted to the corresponding fatty acids by well known oxidation means, or to amines by reductive amination. Thus, the oxo process provides a practical and convenient route to a variety of useful products.

Amenable to the oxo or carbonylation step, to a greater or lesser degree, are not only the olefinic hydrocarbons, but also other organic compounds having a carbon-to-carbon olefinic linkage, such as unsaturated alcohols, acids, esters and the like. Where olefinic hydrocarbons are utilized, these may be derived from a wide variety of sources, the choice depending on the desired final product. Suitable olefins include both straight and branch-chain types such as propylene, butene, pentene, hexene, heptene and styrene, olefin polymers such as di- and tri-isobutylene, polypropylene, and hexene and heptene dimers, and olefinic fractions from the hydrocarbon synthesis reaction, from thermal or catalytic cracking, and from other petroleum processes as well.

The conditions for carbonylating olefins with carbon monoxide and hydrogen vary somewhat in accordance with the nature of the olefin feed and the carbonylation catalyst. In general, the lower olefins react at lower temperatures and to a greater extent than the higher olefins. Similarly, less stringent conditions are required when a pre-formed catalyst is utilized rather than a catalyst formed in situ. Generally, temperatures of about 250° to 450° F. and pressures of about 1500 to 4500 p.s.i.g. are employed; however, with pre-formed catalysts, temperatures and pressures as low as 200° F. and 300 p.s.i.g., respectively, may be used.

The synthesis gas mixture fed to the oxo stage may be any desired ratio of $H_2$ to CO, although ratios of between 0.5 to 5 volumes of hydrogen per volume of CO are preferred. The ratio of synthesis gas to olefin may also vary widely; in general, quantities of from about 2500 to 25,000 cubic meet of $H_2+CO$ per barrel of olefin feed are employed.

The catalyst for the oxo stage of the process is preferably an oil-soluble compound of the catalytically-active metal, although water-soluble catalysts such as cobalt acetate or cobalt chloride have also been used. Pre-formed catalysts, i.e., cobalt carbonyls produced apart from the carbonylation reaction, rather than in situ, such as described in U.S. 2,827,491, are especially advantageous. In general, catalyst concentrations of from about 0.05 to 5.0 weight percent, calculated as metal on olefin feed, are satisfactory.

In the production of alcohols via the oxo reaction, it has been the practice to depressurize the effluent from the oxo reactor, to pass the liquid products at atmospheric or near atmospheric pressure through a decobalting stage wherein the carbonylation catalyst and/or catalyst residues are removed, and then to re-pressurize the demetallized liquid product into the hydrogenation stage. Such a procedure which involves a substantial pressure reduction followed by a substantial pressure increase is economically inefficient. In the past, however, it has not been considered feasible to carry out the several steps of the process without large pressure variations. For example, at the usual oxonation pressures, it has not heretofore been possible to obtain that completeness of demetallizing required to avoid subsequent fouling of the hydrogenation catalyst as well as the hydrogenation equipment surfaces by cobalt metal, which occurs when the soluble cobalt compounds in the feed decompose under the conditions of hydrogenation. In turn, hydrogenation at pressures sufficiently low to obtain satisfactory decobalting has not been considered practicable.

These and other disadvantages are overcome by carrying out the carbonylation reaction at low pressure in the presence of a cobalt carbonyl catalyst, preferably a pre-formed catalyst, e.g., dicobalt octacarbonyl, and thermally soaking the liquid carbonylation product at a pressure not substantially greater than that used in the carbonylation reaction nor substantially lower than that employed in the subsequent hydrogenation step. It has been found that by carrying out the carbonylation and decobalting steps in this way, essentially all the soluble cobalt is surprisingly converted to a metallic form which serves as a low pressure hydrogenation catalyst in the subsequent conversion of the oxo aldehydes to alcohols. Thus, by combining the specific oxonation, thermal treating and hydrogenation steps of the present invention, means are provided for converting olefins to alcohols within the range of low pressures employed in the oxonation reactor. Because high pressures are not utilized in the present combination process, and an increase in pressure is not required in passing from one stage to another, significant savings in process equipment are realized. An additional savings is also provided by eliminating apparatus formerly required to remove catalyst residues after the decobalting step.

While the exact manner in which the specific process steps of the present invention cooperate to produce these desirable results is not completely understood, experimental evidence suggests the following. By conducting the carbonylation reaction at low pressure and in the presence of a cobalt carbonyl catalyst, preferably a pre-formed catalyst, e.g., cobalt octacarbonyl, a high degree of selectivity to aldehydes is realized. Only a small proportion of "bottoms" are formed, since secondary reactions are minimized. In particular, hydrogenation of aldehydes to alcohols, which may occur to the extent of 40–50 percent in high pressure carbonylation reactions is minimized, less than 10 percent alcohols, based on aldehyde, being formed in the specific carbonylation stage of the present process. A minimum concentration of alcohols in the carbonylation step is desirable so as to avoid secondary reaction with the oxo aldehydes. While acetals thus formed are not especially harmful per se, water which simultaneously forms is undesirable. Under high pressures and elevated temperatures, water in the carbonylation step leads to the formation of carboxylic acids. These acids, particularly those having about five or more carbon atoms, interfere with the complete thermal decobalting of the carbonylation product, since under the elevated temperautres of the decobalting step, these acids appear to react with the cobalt metal initially formed to produce thermally stable, aldehyde-soluble, cobalt soaps. The thermally stable cobalt soaps remain dissolved in the aldehyde product even after thermal treatment; consequently, incomplete decobalting is realized which must then be completed by other decobalting means or by a combination of thermal and chemical treatments in order to obtain a hydrogenation feed uncontaminated with soluble cobalt compounds or complexes. The presence of soluble cobalt, especially soaps, introduced into the oxonation product either as the carbonylation catalyst or as the result of secondary reactions, and incompletely removed during decobalting, is believed to materially contribute to the "plating out" and inefficient hydrogenaiton previously experienced. By using a cobalt carbonyl catalyst prepared from non-fatty acid reactants, and low pressure conditions in the carbonylation step, the presence of cobalt soap-forming acid radicals is avoided, thermal conversion of cobalt catalysts to cobalt metal is complete, and in the presence of cobalt in this form, hydrogenation of the aldehyde product can be accomplished both efficiently and smoothly at pressures substantially the same as those utilized in the carbonylation step.

The present invention and its application will be more completely understood from the more detailed description hereinafter, wherein reference will be had to the accompanying drawing which schematically represents a system suitable for carrying out preferred embodiments of the invention.

TABLE I.—OXONATION CONDITIONS

|  | Broad | Preferred | Specific |
|---|---|---|---|
| Temperature, °F | 200–350 | 275–325 | 275–285 |
| Pressure, p.s.i.g | 200–1500 | 500–1200 | 1,000 |
| H₂/CO, molar ratio | 1–5/1 | 1–3/1 | 1–2/1 |
| CO partial pressure, atmos | 10–30 | 20–30 | 20–25 |
| Catalyst, wt. percent Co on feed | 0.05–1 | 0.1–0.3 | 0.2 |
| Residence time, hrs | 1–10 | 1–4 | 1–3 |

TABLE II.—DECOBALTING CONDITIONS

|  | Broad | Preferred | Specific |
|---|---|---|---|
| Temperature, °F | 300–450 | 350–425 | 390–400 |
| Pressure, p.s.i.g | [1] 200–1,500 | [1] 500–1,200 | 1,000 |
| CO partial pressure, atmos | <15 | <10 | <5 |
| Residence time, hrs | 1–10 | 1–4 | 1–3 |

[1] Not substantially greater than the oxonation pressures employed. If temperature exceeds oxo temperature, a corresponding pressure increase may occur.

TABLE III.—HYDROGENATION CONDITIONS

|  | Broad | Preferred | Specific |
|---|---|---|---|
| Temperature, °F | 400–550 | 400–500 | 430–450 |
| Pressure, p.s.i.g | [1] 200–1,500 | [1] 500–1,200 | 1,000 |
| H₂ partial pressure, atmos | 10–100 | 30–80 | 65 |
| Residence time, hrs | 1–4 | 3–4 | 3 |

[1] Not substantially greater than the decobalting pressures employed. If temperature exceeds decobalting temperature, a corresponding pressure increase may occur.

Referring now to the drawing, an olefin feed containing dissolved therein from 0.05 to 1.0 weight percent of cobalt, calculated as metal or olefin feed, in the form of a cobalt carbonyl, e.g., dicobalt octocarbonyl, is passed into oxo reactor 1 via line 2. Synthesis gas comprising hydrogen and carbon monoxide in a molar ratio of about 1–2/1 is introduced through line 3. Under the conditions shown in Table I, the olefin, carbon monoxide and hydrogen react to yield a liquid aldehyde-comprising product which contains less than 10 weight percent alcohols, less than 1 weight percent water and less than 0.1 weight percent cobalt soap forming acid radicals, all percentages based on aldehydes. The liquid product, soluble cobalt carbonyl catalyst and unreacted gases are removed from the reactor through line 4. Gases in the product are separated in separator 5 for purge or recycle through line 6 as may be desired.

The liquid carbonylation product, containing dissolved cobalt therein, is withdrawn from the separator through line 7, and if desired, a portion thereof recycled through line 8, cooler 9, pump 10 and line 11. The balance of the liquid product is passed without cooling or substantial reduction in pressure via line 12 into reactor 13, which is a combined decobalting and hydrogenation reactor. For the purposes of illustrating the invention, the operation of this reactor is described for upflow operation; however, as those skilled in the art will recognize, there is no reason why the reactor may not be operated downflow, if so desired. The lower part of the reactor may be packed with inert solid packing such as Raschig rings or may be unpacked. In addition to the flow of liquid oxo product into the reactor, sufficient preheated hydrogen gas is also admitted through line 14 and heater 15 to reduce the average carbon monoxide partial pressure and to supply additional heat for the decobalting reaction. The decobalting zone is operated under the conditions of Table II, whereupon substantially all of the dissolved cobalt is converted to cobalt metal. In the presence of the cobalt metal and hydrdogen, partial hydrogenation of the aldehyde comprising product occurs in the decobalting section of the reactor. Complete hydrogenation is accomplished as the liquid passes upwardly through the hydrogenation section. While hydrogenation occurs in the presence of the finely divided cobalt metal alone, it is advantageous to provide in the hydrogenation section a fixed bed comprising a carbon monoxide insensitive hydrogenation catalyst, e.g., catalysts comprising sulfides of nickel, tungsten and/or molybdenum, molybdenum sulfide on char being a preferred catalyst. Under the combined catalytic effects of the finely divided cobalt metal and the molybdenum sulfide hydrogenation catalyst, a liquid effluent having a carbonyl number as low as 0.1–1.0 is obtained from the hydrogenation section.

Since the hydrogenation reaction is exothermic, cool hydrogen gas may be provided through line 16 to aid in controlling temperature in the hydrogenation section. The addition of 2 to 10 volume percent water into the hydrogenation zone through line 17 may also be advantageously employed to help control hydrogenation temperature and to diminish the formation of by-products such as hydrocarbons, acetals, ethers, and the like, during the hydrogenation step.

The effluent from reactor 13, still containing cobalt metal suspended therein, is passed through line 18 to separator 19, wherein dissolved gases are separated. These gases, which may comprise as much as 5 to 15 volume percent carbon monoxide, are removed from the separator through line 20, and may be recycled to the oxo stage of the process after reblending with sufficient fresh synthesis gas to give the desired carbon monoxide and hydrogen partial pressures. Alternatively, the gases may be cooled and recycled to the hydrogenation section of reactor 13 via lines 21 and 16, or recycled to the decobalting zone.

The liquid from separator 19 is passed through line 22 to settler 23 wherein the cobalt metal suspended therein is concentrated. The cobalt slurry from the settler can be recycled in part through line 24, pump 25 and line 26 to reactor 13, thereby providing some of the heat required in the decobalting zone as well as additional catalyst for hydrogenation. The remainder of the concentrated slurry may be transferred through line 27 to a carbonylation catalyst preparation system (not shown) for subsequent recycle to the carbonylation reaction.

Liquid from the upper part of the settler is passed through line 28 to filter 29 wherein any residual cobalt metal is removed. The filtered product is then passed through line 30 to any desired finishing operation.

The invention may be illustrated further by the following examples.

Example 1

A $C_7$ polymer olefin feed was oxonated at 284° F. in a stirred autoclave using a volume ratio of $H_2$ to CO of about 1/1, a total pressure of 1000–1100 p.s.i.g., and 0.2 weight percent dicobalt octacarbonyl catalyst, calculated as cobalt metal on olefin feed, introduced as a 2 weight percent benzene solution. After a residence time of about 2 hours, during which time 63 percent conversion of olefin to $C_8$ aldehydes was obtained, sufficient gas was bled off and $H_2$ added to maintain the total pressure at about 1000 p.s.i.g., but to reduce the partial CO pressure to about 15 atmospheres. After maintaining the autoclave at 284° F. for one hour, the CO partial pressure was further reduced to 3 atmospheres, and the contents of the autoclave heated for an additional 20 minutes at 347° F. and a total pressure of about 1000 p.s.i.g.

A sample withdrawn from the autoclave contained black, finely divided, cobalt metal suspended therein which was allowed to settle out. A water-white, supernatant liquid, containing only 0.007 weight percent cobalt, was obtained.

This example illustrates the facility with which the soluble cobalt contained in an oxonation product prepared under low pressure conditions and in the presence of pre-formed cobalt carbonyl catalyst is essentially completely converted by thermal soaking at oxonation pressure into a metallic form.

Example 2

A $C_7$ polymer olefin feed was oxonated under high pressure (3000 p.s.i.g.) at 275°–300° F. using a 1.5/1 volume ratio of hydrogen to carbon monoxide and cobalt tallate (0.2 weight percent Co based on olefin feed) as the carbonylation catalyst. After a residence time of 3 hours at these conditions, the liquid product was removed to a stirred autoclave wherein it was heated for 3 hours at 400° F. under 200 p.s.i.g. hydrogen pressure. The liquid product obtained at the conclusion of this thermal treatment was purple, indicating the presence of soluble cobalt therein.

This example illustrates that even under more stringent conditions of thermal treatment than employed in Example 1, an oxonation product obtained at high pressures and in the presence of a cobalt soap catalyst is incompletely decobalted, substantial amounts of cobalt still remaining in soluble form in the treated product.

Example 3

A $C_7$ polymer olefin feed was oxonated under conditions as set forth in Example 1, except that a cobalt soap, cobalt tallate, was used as the carbonylation catalyst. The conversion of olefin after a residence time of about 2 hours at 302° F. was about 50 percent. As in Example 1, the liquid reaction product was heat-treated at reduced CO partial pressures and under a total pressure of 1000 p.s.i.g. to obtain the following results:

| Temp., °F. | CO Part. Press., Atms. | Time, Minutes | Cobalt in Product, Wt. Percent |
| --- | --- | --- | --- |
| 302 | 34 | 180 | 0.2 |
| 302 | 10 | 45 | 0.05 |
| 392 | 2 | 60 | 0.014 |

Even under these severe heat-treating conditions, the liquid oxonation product, prepared in the presence of a cobalt soap catalyst, contained twice as much dissolved cobalt as that prepared with a pre-formed cobalt carbonyl catalyst.

This example illustrates that even when the oxonation is conducted at low pressures, fatty acid residues from the carbonylation catalyst, e.g. tallate radicals, interfere with the complete removal of soluble cobalt from the oxonation product by thermal treatment.

Example 4

A $C_7$ polymer olefin feed was oxonated with synthesis gas (2/1 volume ratio of hydrogen to CO) at 280° F. and 1000–1100 p.s.i.g. in the presence of 0.2 weight percent cobalt in the form of pre-formed cobalt carbonyl. About 70 percent of the olefin was converted principally to aldehydes within 2.5 hours. The CO partial pressure was reduced to less than 5 atmospheres by purging with hydrogen. The oxonation product was then heated under 900–1000 p.s.i.g. hydrogen pressure at 430° F. to 450° F. The change in product composition with time is shown below:

| Time on Hydro. Conditions, Hrs. | Product Composition, Wt. Percent | | |
| --- | --- | --- | --- |
| | $C_7$ Hydrocarbon | $C_8$ Aldehyde | $C_8$ Alcohol |
| 0 | 29 | 66 | 5 |
| 1.5 | 32 | 59 | 9 |
| 3.0 | 33 | 47 | 20 |

This example illustrates the thermal conversion of soluble cobalt derived from the pre-formed carbonylation catalyst to cobalt metal, and the concurrent catalytic effect of the cobalt metal in the hydrogenation of the oxo aldehydes to the corresponding alcohols.

Example 5

A $C_7$ polymer olefin feed was oxonated as described in the previous example. The product was thermally soaked for 3 hours at 350° F. at 800–1000 p.s.i.g. total gas pressure after reducing the CO partial pressure to less than about 5 atmospheres by purging with hydrogen. About 20 weight percent of molybdenum sulfide on charcoal hydrogenation catalyst was thereupon added without removing the metallic cobalt from the thermally-treated product. Analysis of the product after hydrogenation for 6 hours at 450° F. and 1000 p.s.i.g. pressure showed essentially complete conversion of all $C_8$ aldehyde in the oxonation product to the corresponding alcohol.

This example illustrates the cooperation of the metallic cobalt obtained from the thermal treatment of the oxonation product and the added CO-insensitive hydrogenation catalyst in bringing about the essentially complete hydrogenation of oxo aldehyde to the corresponding alcohol at low pressures. The example further illustrates the combination of the several steps of the present invention into an integrated process wherein olefins are converted to alcohols without substantial changes in pressure intermediate the carbonylation and hydrogenation steps.

While the foregoing general description and illustrative examples will serve to teach the advantages of the invention, it will be apparent to those skilled in the art

What is claimed is:
1. A process for producing alcohols which comprises carbonylating an olefin with hydrogen and carbon monoxide, having a molar ratio of $H_2/CO$ of 1/1 to 5/1, in the presence of a dicobalt octacarbonyl catalyst at a pressure between 200 and 1500 p.s.i.g. and a temperature in the range of 200° to 350° to produce a reaction mixture comprising aldehydes, dissolved dicobalt octacarbonyl and less than 0.1 weight percent, based on said aldehydes, of acid radicals capable of forming soluble cobalt compounds in said aldehydes under process conditions, maintaining at least a portion of said reaction mixture at a pressure of 200 to 1500 p.s.i.g. but not substantially greater than employed in said carbonylating step and at a temperature sufficient to convert said dissolved cobalt carbonyl to cobalt metal and hydrogenating at least a portion of said heat-treated reaction mixture to alcohols in the presence of said cobalt metal at a pressure of 200 to 1500 p.s.i.g. but not substantially greater than said heat treating step and at a temperature in the range of 400 to 500° F.

2. A process according to claim 1 in which said dicobalt octacarbonyl catalyst is prepared apart from said carbonylating reaction from components free of fatty acid radicals.

3. A process according to claim 1 in which said heat-treated product is hydrogenated in the presence of a molybdenum sulfide hydrogenation catalyst in addition to said cobalt metal.

4. A process for producing alcohols from olefins which comprises in combination reacting an olefin with hydrogen and carbon monoxide, having an $H_2/CO$ molar ratio of 1/1 to 5/1, in the presence of a dicobalt octacarbonyl catalyst in a carbonylation zone at a pressure between 500 and 1200 p.s.i.g. and a temperature in the range of 200° to 350° F. to produce a product stream containing aldehydes having from 4 to 20 atoms, 0.05 to 1.0 weight percent dissolved dicobalt octacarbonyl, less than 10 mole percent alcohols and less than 0.1 mole percent cobalt soap-forming acid radicals, both said mole percents being based on said aldehydes, and a water concentration of less than 1 weight percent, passing said stream at substantially carbonylation zone pressure to a thermal decobalting zone, maintaining said stream in said thermal decobalting zone in liquid phase at a decobalting temperature in the range of 300° to 450° F. under a total pressure in the range of 500 to 1200 p.s.i.g. and carbon monoxide partial pressure of less than 5 atmospheres for an average residence time greater than about 30 minutes, thereby producing a slurry containing said aldehydes and in the range of 0.05 to 1.0 weight percent finely divided cobalt metal, directly flowing at least a portion of said slurry without intermediate cooling and substantially at said decobalting zone pressure over a molybdenum sulfide hydrogenation catalyst maintained as a fixed bed in a hydrogenation zone, said hydrogenation zone being maintained at a temperature in the range of 400° to 550° F. and under a hydrogen partial pressure of at least 30 atmospheres, and recovering a product containing the alcohol corresponding to said aldehydes.

5. A process according to claim 4 wherein the product recovered from said hydrogenation zone is separated into an essentially cobalt free liquid portion and a cobalt concentrated slurry portion, and said concentrated slurry portion is at least in part recycled to said thermal decobalting zone.

6. A process according to claim 4 wherein hydrogen is recovered from said hydrogenation zone, and at least a portion thereof cooled and recycled to said hydrogenation zone.

References Cited by the Examiner
UNITED STATES PATENTS

| | | |
|---|---|---|
| 2,557,701 | 6/51 | Smith. |
| 2,636,904 | 4/53 | Starr et al. |
| 2,750,419 | 6/56 | Taylor et al. |
| 2,815,390 | 12/57 | Gwynn et al. _____ 260—638 X |
| 2,840,619 | 6/58 | Mason et al. _____ 260—638 X |
| 2,843,632 | 7/58 | Gwynn et al. |
| 2,856,332 | 10/58 | Mertzweiller. |
| 2,876,264 | 3/59 | Brodkey et al. _____ 260—638 X |

LEON ZITVER, *Primary Examiner.*